US010742492B2

(12) United States Patent
Bower, III et al.

(10) Patent No.: US 10,742,492 B2
(45) Date of Patent: Aug. 11, 2020

(54) MANAGING SERVER NODES ON A MANAGEMENT NETWORK WITH MODIFIED SERVICE DISCOVERY PROTOCOL MESSAGES

(71) Applicant: LENOVO ENTERPRISE SOLUTIONS (SINGAPORE) PTE. LTD., Singapore (SG)

(72) Inventors: Fred A. Bower, III, Durham, NC (US); Caihong Zhang, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 126 days.

(21) Appl. No.: 16/002,719

(22) Filed: Jun. 7, 2018

(65) Prior Publication Data
US 2019/0379580 A1    Dec. 12, 2019

(51) Int. Cl.
*H04L 12/24* (2006.01)
*H04L 29/08* (2006.01)

(52) U.S. Cl.
CPC ...... *H04L 41/0806* (2013.01); *H04L 67/1097* (2013.01); *H04L 67/16* (2013.01); *H04L 67/34* (2013.01)

(58) Field of Classification Search
CPC . H04L 41/0806; H04L 67/1097; H04L 67/16; H04L 67/34
See application file for complete search history.

(56) References Cited

U.S. PATENT DOCUMENTS 9,225,661 B1 *  12/2015  Yang ..................... G06F 9/5077
2011/0281519 A1 *  11/2011  Reuss ................... H04W 8/005
                                                          455/41.2

* cited by examiner

*Primary Examiner* — El Hadji M Sall

(57) ABSTRACT

Managing server nodes on a management network with modified service discovery protocol messages including determining that a first management server requires management data for installation on a server node, wherein the first management server and the server node are communicatively coupled to a management network; determining that the required management data for installation on the server node is not stored on the first management server; broadcasting, on the management network, a first modified service discovery protocol (SDP) message requesting the required management data for installation on the server node; receiving, from a second management server communicatively coupled to the management network, a second modified SDP message providing the required management data for installation on the server node; and installing the required management data on the server node.

20 Claims, 5 Drawing Sheets

MANAGING SERVER NODES ON A MANAGEMENT NETWORK WITH MODIFIED SERVICE DISCOVERY PROTOCOL MESSAGES

BACKGROUND

Field of the Invention

The field of the invention is data processing, or, more specifically, methods, apparatus, and products for managing server nodes on a management network with modified service discovery protocol messages.

Description of Related Art

Data centers may employ management environments to configure and monitor server nodes. New server nodes added to the data center may be deployed based on the characteristics of the server node, the installation location of the server node, and the characteristics and status of other server nodes in the data center. It is important to set up and configure each server node as it is added to the data center as quickly as possible and with minimal input from an administrator.

SUMMARY

Methods, systems, and apparatus for managing server nodes on a management network with modified service discovery protocol messages are disclosed in this specification. Managing server nodes on a management network with modified service discovery protocol messages includes determining that a first management server requires management data for installation on a server node, wherein the first management server and the server node are communicatively coupled to a management network; determining that the required management data for installation on the server node is not stored on the first management server; broadcasting, on the management network, a first modified service discovery protocol (SDP) message requesting the required management data for installation on the server node; receiving, from a second management server communicatively coupled to the management network, a second modified SDP message providing the required management data for installation on the server node; and installing the required management data on the server node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
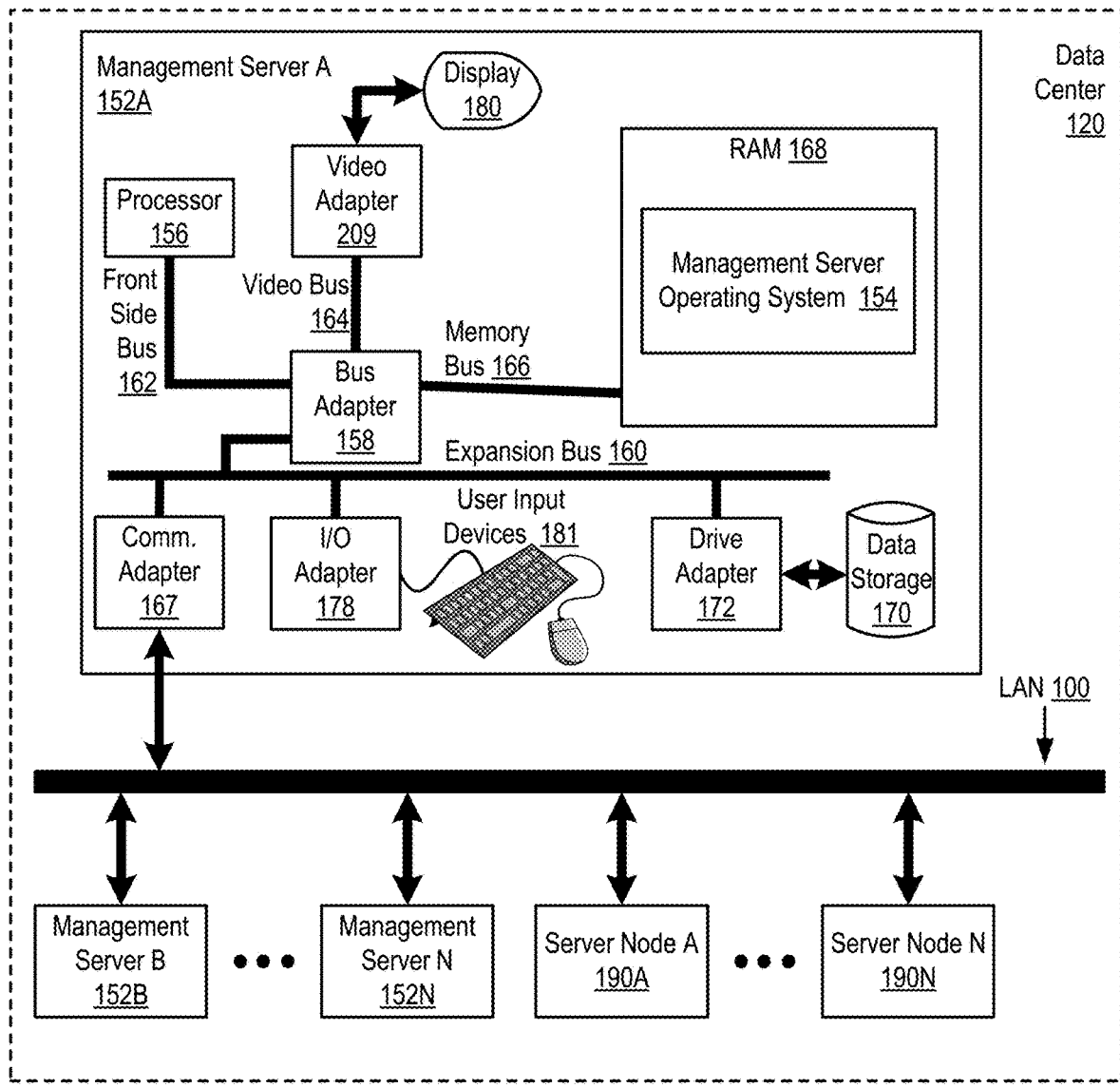
FIG. 1 sets forth a block diagram of an example system configured for managing server nodes on a management network with modified service discovery protocol messages according to embodiments of the present invention.

Exemplary methods, apparatus, and products for managing server nodes on a management network with modified service discovery protocol messages in accordance with the present invention are described with reference to the accompanying drawings, beginning with FIG. 1. FIG. 1 sets forth a block diagram of automated computing machinery comprising an exemplary data center (120) configured for managing server nodes on a management network with modified service discovery protocol messages according to embodiments of the present invention. Management server A (152A) of FIG. 1 includes at least one computer processor (156) or 'CPU' as well as random access memory (168) (RAM') which is connected through a high speed memory bus (166) and bus adapter (158) to processor (156) and to other components of management server A (152A).

Stored in RAM (168) is a management server operating system (154). Operating systems useful in computers configured for managing server nodes on a management network with modified service discovery protocol messages according to embodiments of the present invention include UNIX, Linux™, Microsoft Windows, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170).

Management server A (152A) of FIG. 1 includes disk drive adapter (172) coupled through expansion bus (160) and bus adapter (158) to processor (156) and other components of management server A (152A). Disk drive adapter (172) connects non-volatile data storage to management server A (152A) in the form of data storage (170). Disk drive adapters useful in computers configured for managing server nodes on a management network with modified service discovery protocol messages according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example management server (management server A (152A)) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example management server A (152A) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary management server A (152A) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing server nodes on a management network with modified service discovery protocol messages according to embodiments of the present invention include modems for wired dial-up communications, Ethernet (IEEE 802.3) adapters for wired data communications, and 802.11 adapters for wireless data communications.

The exemplary data center (120) of FIG. 1 also includes other management servers (management server B (152B), management server N (152N)) and multiple server nodes (server node A (190A), server node N (190N)). The management servers (management server A (152A), management server N (152N)) and server nodes (server node A (190A), server node N (190N)) are communicatively coupled together via local area network (LAN) (100) to create a management network.

Figure 2:
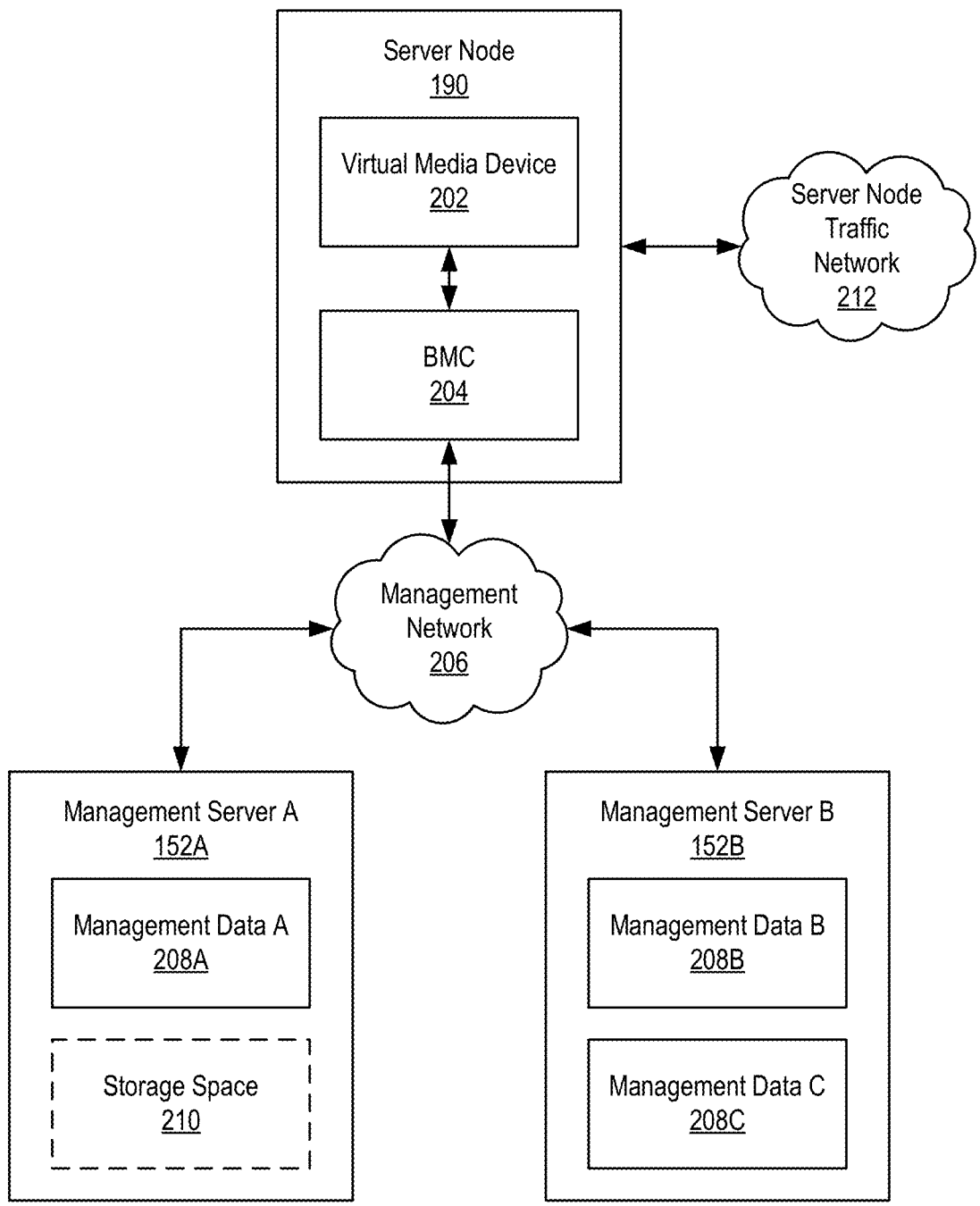
FIG. 2 sets forth a block diagram of an example system configured for managing server nodes on a management network with modified service discovery protocol messages according to embodiments of the present invention.

FIG. 2 shows an exemplary system for managing server nodes on a management network with modified service discovery protocol messages according to embodiments of the present invention. As shown in FIG. 2, the exemplary system includes a server node (190) and two management servers (management server A (152A), management server B (152B)) communicatively coupled together via the management network (206). The server node (190) includes a virtual media device (202) and a baseboard management controller (BMC) (204). Management server A (152A) includes management data A (208A) and available storage space (210). Management server B (152B) includes management data B (208B) and management data C (208C).

The management servers (management server A (152A), management server B (152B)) are computing systems that use management data (management data A (208A), management data B (208B), management data C (208C)) to provision, configure, and manage server nodes. The management servers may detect that a new server node (190) has been attached to the management network (206), determine a server node configuration for the server node, configure the server node using the server node configuration, including installing the required management data onto the server node, and monitor the server node once the server node is deployed.

The management data (management data A (208A), management data B (208B), management data C (208C)) is data used to configure and manage a server node (190). The management data may be firmware, operating systems, or applications for installation on a server node. Each management server may have a different set of management data stored thereon. Specifically, instead of each management server maintaining a copy of all potentially required management data, different management servers may store different management data. If one management server requires management data not stored on that management server, the management server may request the required management data from another management server. The available storage space (210) is an unused portion of non-volatile storage controlled by management server A (152A). Another management server (e.g., management server B (152B)) may request from management server A (152A) the ability to store management data in the available storage space (210). Once the other management server has transferred the management data to the available storage space (210), either the other management server or management server A (152A) control that portion of the storage space.

The server node (190) is a computing system managed by one or more management servers (management server A (152A), management server B (152B)). The server node (190) may execute a workload and/or provide a networked service. The workload may be processed, or the network service provided, primarily using the server node traffic network (212).

The BMC (204) is a microcontroller communicatively coupled to the server node (190) that provides out-of-band communication between a management server (management server A (152A), management server B (152B)) and the server node (190). The term "out-of-band" refers to a communication path that bypasses one or more other communication paths. An out-of-band communication path may bypass a main (i.e., in-band) communication path between the management server (management server A (152A), management server B (152B)) and the server node (190), such as the communication path through the server node traffic network (212) or an expansion bus path (e.g., a peripheral component interconnect communications path). As shown in the example of FIG. 2, the management network (206) and the BMC (204) provide an out-of-band communication path between the management servers and the server node (190) that bypasses a main communication path via the server node traffic network (212). The BMC (204) of each server node (190) may be communicatively coupled to the management network (206).

The virtual media device (202) is an aggregation of hardware and software that presents a media device to the server node (190). Specifically, the virtual media device (202) interacts with the server node (190) as though the virtual media device were a physical media device attached to the server node (190). The virtual media device (202) may be controlled and populated by the BMC (204) such that management data (management data A (208A), management data B (208B), management data C (208C)) may be transferred over the management network (206) to the BMC (204), where the management data is presented on the virtual media device (202) as a hardware storage device mounted on the server node (190).

The management network (206) is a communications network that couples management servers (management server A (152A), management server B (152B)) and server nodes (server node (190)). The management network (206) isolates management traffic from server node traffic on the server node traffic network (212). Management traffic is data sent among management servers (e.g., management server A (152A), management server B (152B)) and between management servers and server nodes (server node (190)). Management traffic includes instructions and data to provision, configure, and manage server nodes.

Server node traffic on the server node traffic network (212) is data sent among server nodes (e.g., server node (190)) and between server nodes and a wide area network. The server node traffic may be traffic sent to and from services provided by the server nodes. The server node traffic may also be data transfers in service of workload processing performed by the server nodes. The server node (190) may be connected to a server node traffic network (212) via a communications adapter on the server node (190).

Figure 3:
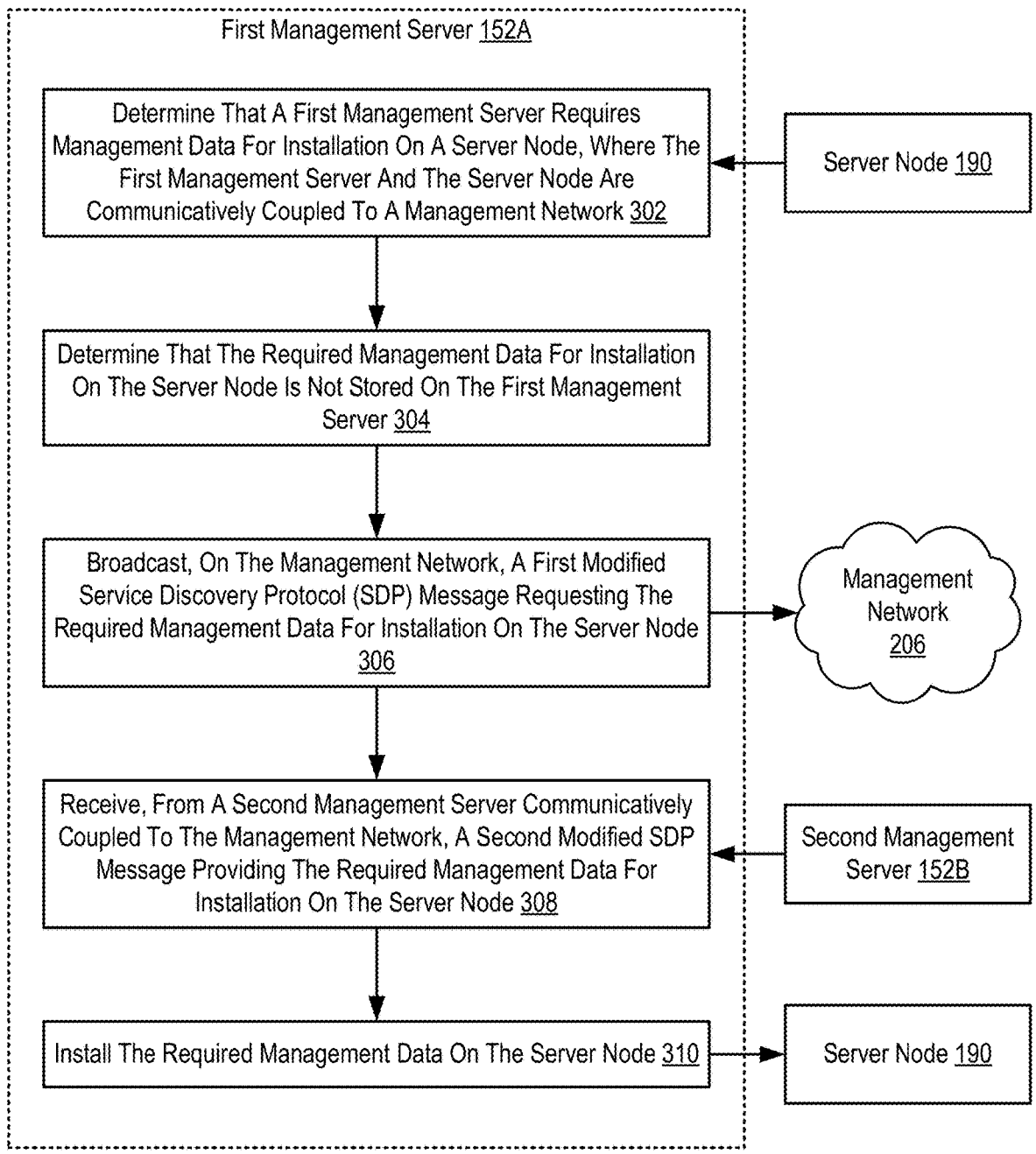
FIG. 3 sets forth a flow chart illustrating an exemplary method for managing server nodes on a management network with modified service discovery protocol messages according to embodiments of the present invention.

For further explanation, FIG. 3 sets forth a flow chart illustrating an exemplary method for managing server nodes on a management network with modified service discovery protocol messages according to embodiments of the present invention that includes determining (302) that a first management server (152A) requires management data for installation on a server node (190), wherein the first management server (152A) and the server node (190) are communicatively coupled to a management network (206). Determining (302) that a first management server (152A) requires management data for installation on a server node (190), wherein the first management server (152A) and the server node (190) are communicatively coupled to a management network (206) may be carried out by receiving a message requesting configuration of the server node (190); determining a server node configuration for the server node (190); and determining the required management data based on the server node configuration.

For example, a new server node (190) may be attached to the management network (e.g., via the BMC of the server node (190)). In response to being powered up and connected to a management network (e.g., via the BMC), the new server node (190) may send out a message requesting configuration. The first management server (152A) may receive the message and look up the server node configuration for a new server node (190) of the same type. The server node configuration may indicate that the new server node (190) should have version 5 of the operation system installed.

The method of FIG. 3 further includes determining (304) that the required management data for installation on the server node (190) is not stored on the first management server (152A). Determining (304) that the required management data for installation on the server node (190) is not stored on the first management server (152A) may be carried out by searching the storage on the first management server (152A) and storage controlled by the first management server (152A) for management data that matches the required management data for installation on the server node (190).

Continuing with the example from above, the first management server (152A) may search the storage on the first management server (152A) and storage controlled by the first management server (152A) for version 5 of the operating system and determine that version 5 of the operating system is not stored on the first management server (152A) or on storage controlled by the first management server (152).

Determining (304) that the required management data for installation on the server node (190) is not stored on the first management server (152A) improves the operation of the computer system by eliminating redundant copies of management data stored across all management servers on the management network, reducing system overhead and increasing system efficiency. Not every management server stores all necessary management data. Instead, only of a subset of management data is stored on each management server, and management data not currently stored on any given management server may be requested by that management server from other management servers on the management network.

The method of FIG. 3 further includes broadcasting (306), on the management network (206), a first modified service discovery protocol (SDP) message requesting the required management data for installation on the server node (190). Broadcasting (306), on the management network (206), a first modified service discovery protocol (SDP) message requesting the required management data for installation on the server node (190) may be carried out by generating the modified SDP message and initiating a transfer of the modified SDP message such that each computer system on the management network (206) receives the modified SDP message.

A SDP message is a message in a language common to devices on the management network (206). SDP messages may be sent and processed automatically to discover the services available on the management network (206). Examples of service discovery protocols include Service Location Protocol (SLP), Dynamic Host Configuration Protocol (DHCP), Universal Plug and Play (UPnP), and Session Announcement Protocol (SAP).

SLP is a protocol that allows computing systems and other devices to find services on a network without prior configuration. SLP operates at the application-layer of the Open Systems Interconnection (OSI) model. SLP messages, as defined in the protocol, may request a service (function 1), respond to service request (function 2), register a server (function 3), deregister a server (function 4), acknowledge a service (function 5), request an attribute (function 6), reply with an attribute (function 7), advertise a directory agent (function 8), request a service type (function 9), or reply with a service type (function 10). The type of SLP message may be indicated in the "function" field of the SLP header.

A modified SDP message may include at least one field undefined by the service discovery protocol. Specifically, the modified SDP message may include fields in addition to the fields defined in the service discovery protocol and/or may redefine existing fields. An SLP header may include a "version", "function", "length", "overflow", "monolingual", "universal resource location authentication", "attribute authentication", "fresh", "dialect", "language code", "character encoding", and "transaction identifier" fields. One or more the of the SLP header fields and the data field may be repurposed to generate a modified SLP message.

For example, the first management server may use a modified SLP message to request management data as a service. Specifically, the "function" field in the SLP header may indicate a request for service (function 1) and the "data" field may include an indication that the request is for management data and an identifier of the management data. Management servers on the management network may interpret the modified SLP message as a request for management data identified by the management data identifier. Other devices not configured for such modified SLP messages may interpret the modified SLP message as a request for a service not provided by that device (and ignore the message).

As an alternative example, the first management server may use a modified SLP message in which the "function" field in the SLP header indicates a request for management data and the "data" field includes an identifier of the management data. Both management servers may understand that a "4" in the function field of the modified SLP message indicates a request for management data, rather than a "service deregister" as in the standard SLP definition.

The modified SDP message generated by the first management server (152A) may include an identifier of the required management data for installation on the server node. The identifier of the required management data may be stored in one of the header fields of the SDP message. Alternatively, the identifier of the required management data may be stored in the data field of the SDP message. The identifier of the required management data may be a text string of the commonly used title of the required management data. Alternatively, the identifier of the required management data may be alphanumeric code understood by the management servers as referring to the required management data.

Broadcasting (306), on the management network (206), a first modified service discovery protocol (SDP) message requesting the required management data for installation on the server node (190) improves the operation of the computer system by simplifying communication between management servers on a management network without implementing an entirely new protocol, increasing efficiency and robustness of the network and network communication.

The method of FIG. 3 further includes receiving (308), from a second management server (152B) communicatively coupled to the management network (206), a second modified SDP message providing the required management data for installation on the server node (190). Receiving (308), from a second management server (152B) communicatively coupled to the management network (206), a second modified SDP message providing the required management data for installation on the server node (190) may be carried out by detecting a response to the broadcasted first modified SDP message and parsing the modified SDP message.

For example, the second management server may use a modified SLP message in which the "function" field in the SLP header indicates a service reply (function 2) and the "data" field includes an identifier of the location of the management data, such as a URL. As an alternative example, the second management server may use a modified SLP message in which the "function" field in the SLP header indicates a response to a request for management data and the "data" field includes an identifier of the location of the management data. Both management servers may understand that a "5" in the function field of the modified SLP message indicates a response to the request for management data, rather than a "acknowledgment of service" as in the standard SLP definition.

The required management data may be provided for installation on the server node in that the second modified SDP message may include an indication of the availability of the required management data for installation on the server node. The second modified SDP message may provide a reference or URL of the required management data that is then utilized by the first management server to initiate the installation of the required management data on the server node. The reference or URL may point to a location on the second management server or to a storage location elsewhere on the management network.

Receiving (308), from a second management server (152B) communicatively coupled to the management network (206), a second modified SDP message providing the required management data for installation on the server node (190) improves the operation of the computer system by simplifying communication between management servers on a management network without implementing an entirely new protocol, increasing efficiency and robustness of the network and network communication. Further, eliminating redundant copies of management data stored across all management servers on the management network reduces system overhead and increases system efficiency.

Each management server may maintain a list of management data and locations on the management network from which each management data may be obtained. This may be accomplished by sending out a modified SDP message requesting a listing of each management data stored on and/or controlled by each management server. Each management server may then respond with a list of each management data stored on and/or controlled by the management server.

The method of FIG. 3 further includes installing (310) the required management data on the server node (190). Installing (310) the required management data on the server node (190) may be carried out by transmitting the required management data to a BMC on the server node (190), where the BMC then mounts the management data on the virtual media device of the server node (190). Detecting the mounted management data, the server node (190) may then automatically install the management data on the server node (190).

For example, the first management server (152A) may determine that the BMC on a server node (190) requires the November 2017 version of the BMC firmware. The first management server (152A) may then search for that version of the BMC firmware within its own storage, and determine that first management server (152A) does not have a copy of that version of the firmware. The first management server (152A) may then generate a modified SLP message requesting the November 2017 version of the BMC firmware and broadcast that message to each management server on the management network. The second management server (152B) may be the first to respond to the first management server (152A) and provide a Uniform Resource Locator (URL) to the November 2017 version of the BMC firmware stored on the second management server (152B). The first management server (152A) may then initiate a transfer from the second management server (152B) to the BMC of the server node (190) to install the November 2017 version of the BMC firmware on the server node. Initiating the transfer may include instructing an update process on the server node to utilize the URL to install the November 2017 version of the BMC firmware.

Figure 4:
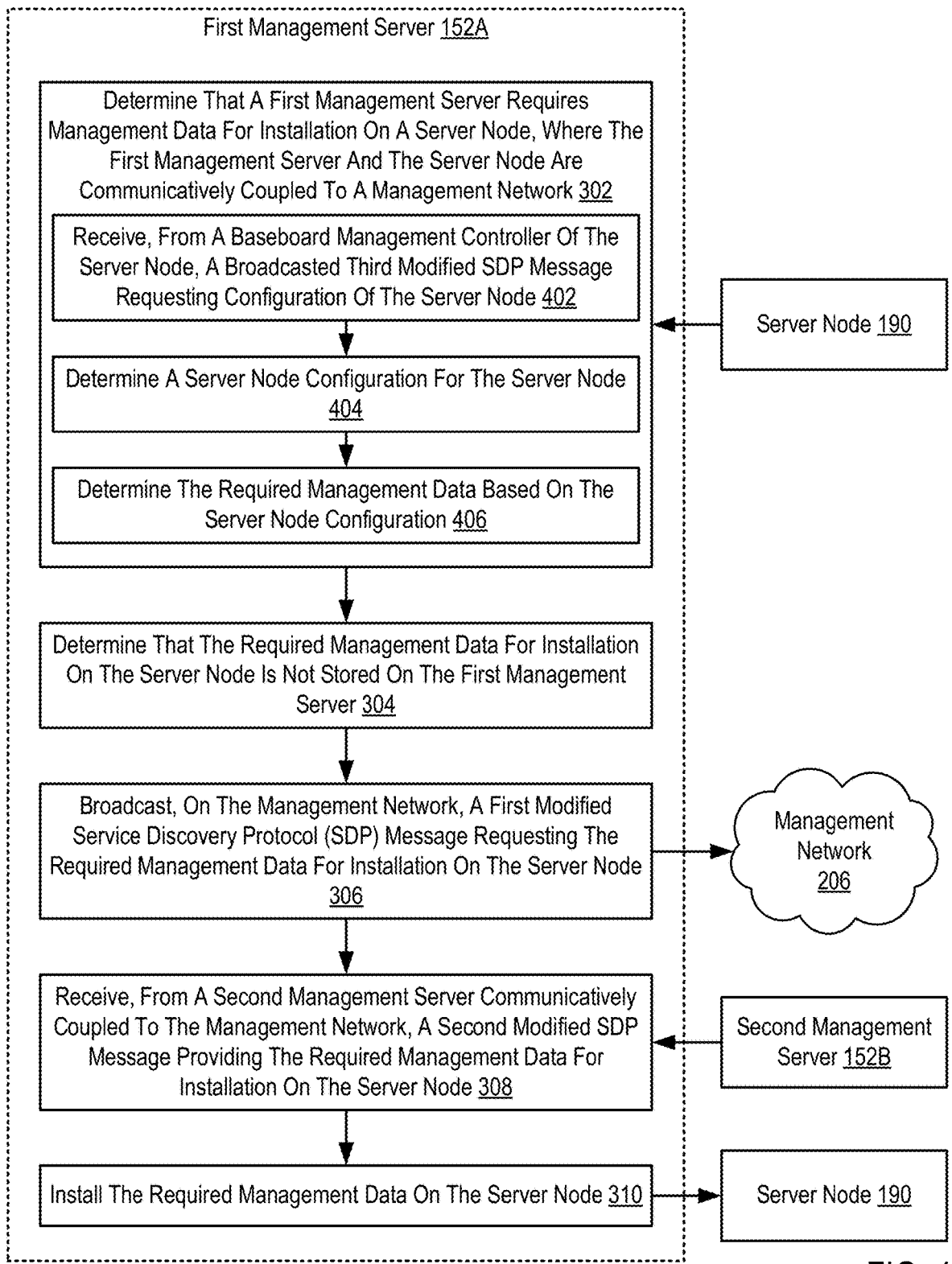
FIG. 4 sets forth a flow chart illustrating an exemplary method for managing server nodes on a management network with modified service discovery protocol messages according to embodiments of the present invention.

For further explanation, FIG. 4 sets forth a flow chart illustrating a further exemplary method for managing server nodes on a management network with modified service discovery protocol messages according to embodiments of the present invention that includes determining (302) that a first management server (152A) requires management data for installation on a server node (190), wherein the first management server (152A) and the server node (190) are communicatively coupled to a management network (206); determining (304) that the required management data for installation on the server node (190) is not stored on the first management server (152A); broadcasting (306), on the management network (206), a first modified service discovery protocol (SDP) message requesting the required management data for installation on the server node (190); receiving (308), from a second management server (152B) communicatively coupled to the management network (206), a second modified SDP message providing the required management data for installation on the server node (190); and installing (310) the required management data on the server node (190).

The method of FIG. 4 differs from the method of FIG. 3, however, in that determining (302) that a first management server (152A) requires management data for installation on a server node (190), wherein the first management server (152A) and the server node (190) are communicatively coupled to a management network (206) includes receiving (402), from a baseboard management controller of the server node (190), a broadcasted third modified SDP message requesting configuration of the server node (190); determining (404) a server node configuration for the server node (190); and determining (406) the required management data based on the server node configuration.

Receiving (402), from a baseboard management controller of the server node (190), a broadcasted third modified SDP message requesting configuration of the server node (190) may be carried out by the BMC generating the third modified SDP message with an indication that the server node (190) requires configuration.

For example, a new server node (190) may be attached to the management network (206). Upon booting up, the new server node (190) may begin transmitting a modified SDP message requesting configuration. The modified SDP message may include the network address of the server node (190) and the type of hardware in the server node (190).

Determining (404) a server node configuration for the server node (190) may be carried out by the first management server (152A) evaluating the modified SDP message and matching the new server node (190) to a server node configuration. The server node configuration is data instructing the first management server (152A) regarding how to provision the server node (190). The server node configuration may include the types and versions of firmware, operating systems, and applications to be installed on the server node. The server node configuration may also include information on the workload or service that the server node (190) is to process or provide.

Determining (406) the required management data based on the server node configuration may be carried out by evaluating the server node configuration and extracting a list of required management data for installation on the new server node (190). The list of required management data may then be compared to the list of stored management data on the first management server (152A) to determine which management data is not present on the first management server (152A) and must be retrieved from a different management server.

Figure 5:
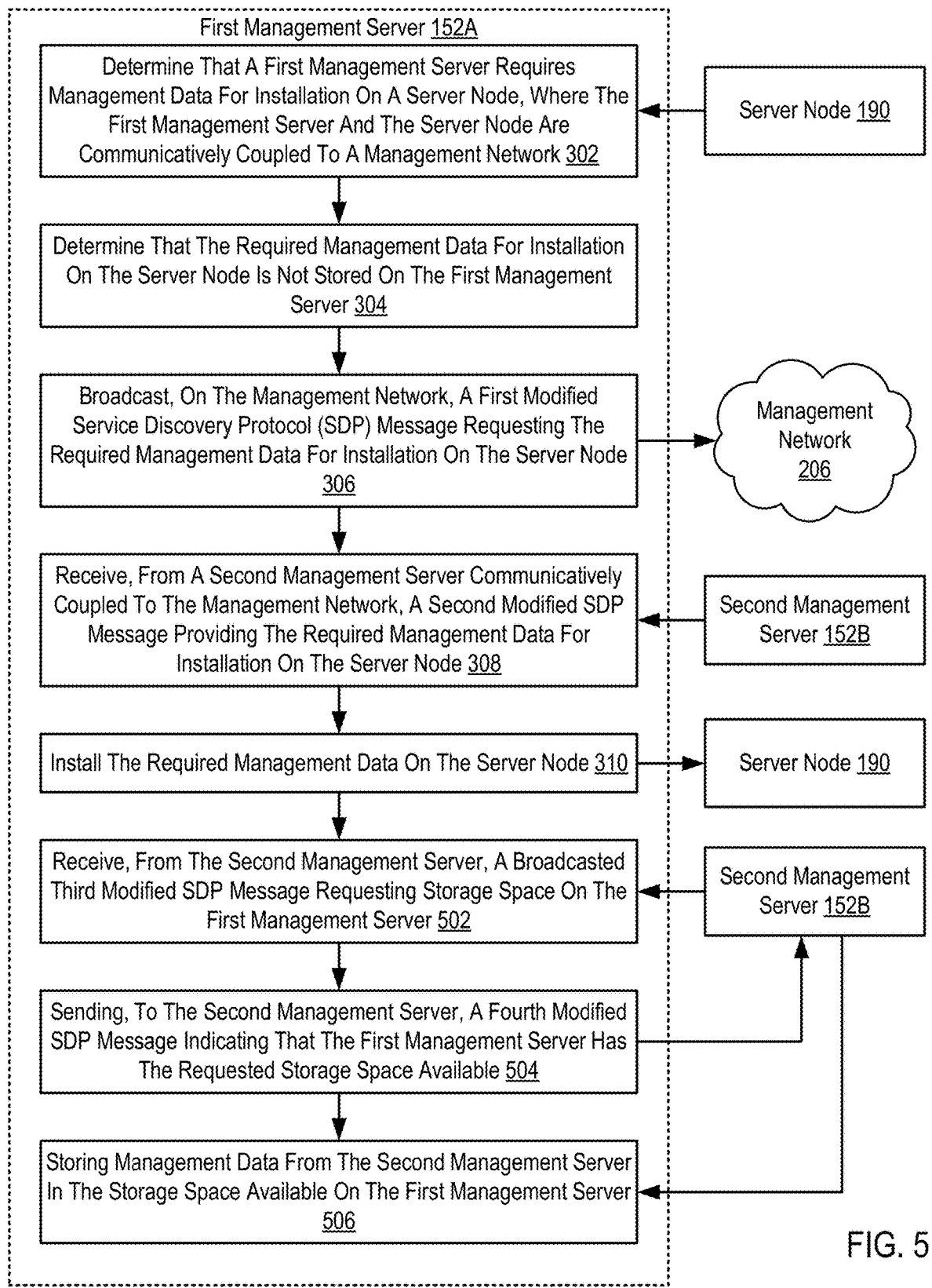
FIG. 5 sets forth a flow chart illustrating an exemplary method for managing server nodes on a management network with modified service discovery protocol messages according to embodiments of the present invention.

For further explanation, FIG. 5 sets forth a flow chart illustrating a further exemplary method for managing server nodes on a management network with modified service discovery protocol messages according to embodiments of the present invention that includes determining (302) that a first management server (152A) requires management data for installation on a server node (190), wherein the first management server (152A) and the server node (190) are communicatively coupled to a management network (206); determining (304) that the required management data for installation on the server node (190) is not stored on the first management server (152A); broadcasting (306), on the management network (206), a first modified service discovery protocol (SDP) message requesting the required management data for installation on the server node (190); receiving (308), from a second management server (152B) communicatively coupled to the management network (206), a second modified SDP message providing the required management data for installation on the server node (190); and installing (310) the required management data on the server node (190).

The method of FIG. 5 differs from the method of FIG. 3, however, in that the method of FIG. 5 further includes receiving (502), from the second management server (152B), a broadcasted third modified SDP message requesting storage space on the first management server (152A); sending (504), to the second management server (152B), a fourth modified SDP message indicating that the first management server (152A) has the requested storage space available; and storing (506) management data from the second management server (152B) in the storage space available on the first management server (152A).

Receiving (502), from the second management server (152B), a broadcasted third modified SDP message requesting storage space on the first management server (152A) may be carried out by detecting that the second management server (152B) has sent the broadcasted third modified SDP message that includes a request for storage space and an indication of the amount of storage space requested.

For example, the second management server (152B) may use a modified SLP message to request the storage space as a service. Specifically, the "function" field in the SLP header may indicate a request for service (function 1) and the "data" field may include an indication that the request is for available storage space and an identifier of the amount of requested storage. Management servers on the management network may interpret the modified SLP message as a request for a specified amount of available storage space. Other devices not configured for such modified SLP messages may interpret the modified SLP message as a request for a service not provided by that device (and ignore the message).

As an alternative example, the second management server (152B) may broadcast a modified SLP message with a "6" in the function field to indicate that the modified SLP message is a request for storage space. The management servers recognize the modified SLP message as a request for storage space (instead of an attribute request as defined in the service location protocol). The data field may contain an identifier of the amount of space requested.

Sending (504), to the second management server (152B), a fourth modified SDP message indicating that the first management server (152A) has the requested storage space available may be carried out by the first management server (152A) determining that sufficient storage exists on the first management server (152A) to allow the second management server (152B) to utilize the requested amount of storage space. The first management server (152A) may then generate the fourth modified SDP message and send the message to the second management server (152B). The fourth modified SDP message may include a URL of a storage location on the first management server (152A) at which the second management server (152B) may store the management data.

Storing (506) management data from the second management server (152B) in the storage space available on the first management server (152A) may be carried out by the second management server (152B) sending the management data to the storage location identified by the first management server (152A) in the fourth modified SDP message.

Once the management data from the second management server (152B) has been stored in the storage space on the first management server (152A), the SDP response may be augmented to indicate that the requested storage space is no longer available. Augmenting the SDP response to indicate that the requested storage space is no longer available may be carried out by modifying the logic within the second management server (152B) to provide different responses to received modified SDP messages. SDP responses may be augmented in response to any change in the characteristics of the management servers or server nodes. For example, once a server node is configured and processing a workload, the SDP response may be altered to no longer transmit an SDP message requesting configuration.

Augmenting the SDP response to indicate that the requested storage space is no longer available may also be carried out by stopping the responses to SDP requests for available storage space. Further, each time a SDP response to a request for available storage space is generated, the amount of available space may be determined at the time of the request, and the current amount of available space may then be included in the response.

In view of the explanations set forth above, readers will recognize that the benefits of managing server nodes on a management network with modified service discovery protocol messages according to embodiments of the present invention include:

- Improving the operation of a computing system by repurposing an existing communication protocol for greater functionality, simplifying communication between management servers on a management network without implementing an entirely new protocol, increasing efficiency and robustness of the network and network communication.
- Improving the operation of a computing system by dispersing required management data across multiple management servers, eliminating redundant copies of management data stored across all management servers on the management network, reducing system overhead and increasing system efficiency.

Exemplary embodiments of the present invention are described largely in the context of a fully functional computer system for managing server nodes on a management network with modified service discovery protocol messages. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by program instructions on a computing device,
determining that a first management server requires management data for installation on a server node, wherein the first management server and the server node are communicatively coupled to a management network;
determining that the required management data for installation on the server node is not stored on the first management server;
broadcasting, on the management network, a first modified service discovery protocol (SDP) message requesting the required management data for installation on the server node;
receiving, from a second management server communicatively coupled to the management network, a second modified SDP message providing the required management data for installation on the server node; and
installing the required management data on the server node.

2. The method of claim 1, wherein determining that the first management server requires management data for installation on the server node comprises:
receiving, from a baseboard management controller of the server node, a broadcasted third modified SDP message requesting configuration of the server node;
determining a server node configuration for the server node; and
determining the required management data based on the server node configuration.

3. The method of claim 1, further comprising:
receiving, from the second management server, a broadcasted third modified SDP message requesting storage space on the first management server;
sending, to the second management server, a fourth modified SDP message indicating that the first management server has the requested storage space available; and
storing management data from the second management server in the storage space available on the first management server.

4. The method of claim 3, further comprising:
augmenting a SDP response to indicate that the requested storage space is no longer available.

5. The method of claim 1, wherein the second modified SDP message providing the required management data for installation on the server node comprises an indication of the availability of the required management data for installation on the server node.

6. The method of claim 1, wherein the first modified SDP message comprises at least one field undefined by the service discovery protocol.

7. The method of claim 1, wherein the first modified SDP message comprises an identifier of the required management data for installation on the server node, wherein the management data comprises firmware, operating systems, and/or applications installed by the first management server on the server node to configure and manage the server node.

8. An apparatus comprising a computing device, a computer processor, and a computer memory operatively coupled to the computer processor, the computer memory having disposed within it computer program instructions that, when executed by the computer processor, cause the apparatus to carry out the steps of:
determining that a first management server requires management data for installation on a server node, wherein the first management server and the server node are communicatively coupled to a management network;
determining that the required management data for installation on the server node is not stored on the first management server;
broadcasting, on the management network, a first modified service discovery protocol (SDP) message requesting the required management data for installation on the server node;
receiving, from a second management server communicatively coupled to the management network, a second modified SDP message providing the required management data for installation on the server node; and
installing the required management data on the server node.

9. The apparatus of claim 8, wherein determining that the first management server requires management data for installation on the server node comprises:
    receiving, from a baseboard management controller of the server node, a broadcasted third modified SDP message requesting configuration of the server node;
    determining a server node configuration for the server node; and
    determining the required management data based on the server node configuration.

10. The apparatus of claim 8, wherein the computer program instructions further cause the apparatus to carry out the steps of:
    receiving, from the second management server, a broadcasted third modified SDP message requesting storage space on the first management server;
    sending, to the second management server, a fourth modified SDP message indicating that the first management server has the requested storage space available; and
    storing management data from the second management server in the storage space available on the first management server.

11. The apparatus of claim 10, wherein the computer program instructions further cause the apparatus to carry out the steps of:
    augmenting a SDP response to indicate that the requested storage space is no longer available.

12. The apparatus of claim 8, wherein the second modified SDP message providing the required management data for installation on the server node comprises an indication of the availability of the required management data for installation on the server node.

13. The apparatus of claim 8, wherein the first modified SDP message comprises at least one field undefined by the service discovery protocol.

14. The apparatus of claim 8, wherein the first modified SDP message comprises an identifier of the required management data for installation on the server node, wherein the management data comprises firmware, operating systems, and/or applications installed by the first management server on the server node to configure and manage the server node.

15. A computer program product including a computer readable medium, the computer program product comprising computer program instructions that, when executed, cause a computer to carry out the steps of:
    determining that a first management server requires management data for installation on a server node, wherein the first management server and the server node are communicatively coupled to a management network;
    determining that the required management data for installation on the server node is not stored on the first management server;
    broadcasting, on the management network, a first modified service discovery protocol (SDP) message requesting the required management data for installation on the server node;
    receiving, from a second management server communicatively coupled to the management network, a second modified SDP message providing the required management data for installation on the server node; and
    installing the required management data on the server node.

16. The computer program product of claim 15, wherein determining that the first management server requires management data for installation on the server node comprises:
    receiving, from a baseboard management controller of the server node, a broadcasted third modified SDP message requesting configuration of the server node;
    determining a server node configuration for the server node; and
    determining the required management data based on the server node configuration.

17. The computer program product of claim 15, wherein the computer program instructions further cause the computer to carry out the steps of:
    receiving, from the second management server, a broadcasted third modified SDP message requesting storage space on the first management server;
    sending, to the second management server, a fourth modified SDP message indicating that the first management server has the requested storage space available; and
    storing management data from the second management server in the storage space available on the first management server.

18. The computer program product of claim 17, wherein the computer program instructions further cause the computer to carry out the steps of: augmenting a SDP response to indicate that the requested storage space is no longer available.

19. The computer program product of claim 15, wherein the second modified SDP message providing the required management data for installation on the server node comprises an indication of the availability of the required management data for installation on the server node.

20. The computer program product of claim 15, wherein the first modified SDP message comprises at least one field undefined by the service discovery protocol.

* * * * *